UNITED STATES PATENT OFFICE.

JOHN M. WEISS, OF NEW YORK, N. Y., ASSIGNOR TO THE BARRETT COMPANY, A CORPORATION OF NEW JERSEY.

PROCESS OF PURIFYING CARBAZOL.

1,301,796. Specification of Letters Patent. Patented Apr. 22, 1919.

No Drawing. Application filed October 25, 1918. Serial No. 259,708.

*To all whom it may concern:*

Be it known that I, JOHN M. WEISS, a citizen of the United States, residing at 210 West 110th street, in the county of New York and State of New York, have invented certain new and useful Improvements in Processes of Purifying Carbazol, of which the following is a specification.

This invention relates to a process whereby carbazol is obtained from ordinary commercial carbazol in a purer form than has heretofore been practicable, in a rapid and efficient manner. It relates more particularly to the purification of carbazol by precipitating the same from a solution while the impurities with which it is usually contaminated remain in the solution.

Ordinary commercial carbazol which is recovered from crude anthracene by solvent processes in practice usually contains only about 80% of carbazol, the remainder being mainly anthracene and divers coal tar products in smaller quantities. It is impractical to separate the carbazol by fractional distillation as its boiling point is too close to that of anthracene. Heretofore it has been impractical to purify the carbazol further due to the difficulties encountered and the expense and loss entailed in the proposed methods of purification. This invention utilizes the principle that carbazol is soluble in cold, concentrated sulfuric acid without appreciable sulfonation, and can be precipitated from the solution, substantially unchanged, by the addition of water, whereas the ordinary substances accompanying carbazol are sulfonated and remain in the water solution.

In practising this invention partially purified carbazol containing anthracene and the impurities are treated with concentrated $H_2SO_4$, care being taken that the temperature does not rise to such an extent that an objectionable amount of sulfonation of the carbazol will result. During this treatment the carbazol present in the material is dissolved by the concentrated sulfuric acid, and the anthracene and other impurities may be sulfonated by the excess of acid which is used. During the addition of the acid the temperature of the materials may be maintained within proper limits by circulating a cooling medium through cooling coils therein, if necessary.

After sufficient sulfuric acid has been added to dissolve the carbazol and sulfonate the impurities, water is added to dilute the solution. This dilution of the acid results in the precipitation of the carbazol practically unchanged thereby rendering it possible to recover the carbazol and leaving the anthracene and other impurities, or sulfonic acids of the same in solution. The precipitate may be separated from the supernatent liquid by filtration or any other convenient means.

Carbazol does not appear to possess very strong basic properties, nor does it readily form salts with acids. By the process above described it may be separated from anthracene and other impurities in solution in a very rapid, effective, and economical manner.

As a specific illustration of this invention a quantity of commercial carbazol containing 10 to 15% of impurities such as anthracene or other coal tar products may have added thereto about 2 to 6 times its weight, more or less, of (90–98%) sulfuric acid while the temperature is maintained below 35° C. by any appropriate means. The acid may be added in a thin stream while the mixture is constantly stirred. About 8 to 12 parts of water may then be added and the mixture allowed to settle, when the liquid is drawn off or otherwise separated from the precipitate. It is to be understood that this example is given for illustrative purposes as the strength and amount of acid, water and time of settling will depend largely upon the initial purity of the material treated, and can be easily ascertained by trial. The purified product obtained by this method contains 96% or more of carbazol and is substantially entirely free from anthracene. By a single sublimation it gives substantially pure carbazol.

Claims:

1. The herein described process, which comprises adding sufficient concentrated sulfuric acid at normal temperature to mixtures containing carbazol to dissolve the carbazol and sulfonate other constituents of the mixture, and adding sufficient water to cause carbazol to be precipitated.

2. The herein described process, which comprises adding sufficient concentrated sulfuric acid to mixtures containing carbazol to dissolve the carbazol and sulfonate other constituents of the mixture, while preventing the temperature from rising sufficiently high to cause appreciable sulfonation of the carbazol, and adding sufficient water to cause carbazol to be precipiated.

3. The herein described process, which comprises adding sufficient concentrated sulfuric acid to carbazol containing a small amount of hydrocarbons to dissolve the carbazol and sulfonate the hydrocarbons, so diluting with water as to precipitate the carbazol, and separating the liquid and carbazol.

4. The herein described process, which comprises adding sufficient concentrated sulfuric acid to carbazol containing a small amount of hydrocarbons to dissolve the carbazol and sulfonate the hydrocarbons, so diluting with water as to precipitate the carbazol, separating the liquid and carbazol, and subliming the carbazol.

5. The herein described process which comprises adding two to six parts of 90% to 98% sulfuric acid to one part of carbazol containing less than 20% of anthracene and other impurities, while maintaining the temperature below 35° C., diluting the resulting mixture with sufficient water to precipitate the carbazol, and filtering.

6. The herein described process which comprises adding two to six parts of 90% to 98% sulfuric acid to one part of carbazol containing less than 20% of anthracene and other impurities, while maintaining the temperature below 35° C., diluting the resulting mixture with sufficient water to precipitate the carbazol, filtering, and subliming the carbazol.

In testimony whereof I affix my signature.

JOHN M. WEISS.